United States Patent
Chiang et al.

(10) Patent No.: US 10,162,994 B2
(45) Date of Patent: *Dec. 25, 2018

(54) CAPACITIVE FINGERPRINT SENSING APPARATUS

(71) Applicant: Raydium Semiconductor Corporation, Hsinchu (TW)

(72) Inventors: Chang-Ching Chiang, Taichung (TW); Kun-Pei Lee, Miaoli County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 81 days.

This patent is subject to a terminal disclaimer.

(21) Appl. No.: 15/404,367

(22) Filed: Jan. 12, 2017

(65) Prior Publication Data

US 2017/0206394 A1    Jul. 20, 2017

Related U.S. Application Data

(63) Continuation-in-part of application No. 15/206,587, filed on Jul. 11, 2016, now Pat. No. 9,830,494.

(60) Provisional application No. 62/279,024, filed on Jan. 15, 2016.

(51) Int. Cl.
*G06K 9/00* (2006.01)
*G06K 9/38* (2006.01)

(52) U.S. Cl.
CPC ............ *G06K 9/0002* (2013.01); *G06K 9/38* (2013.01)

(58) Field of Classification Search
CPC ................................ G06K 9/0002; G06K 9/38
USPC ........................................................ 382/124
See application file for complete search history.

(56) References Cited

U.S. PATENT DOCUMENTS

| | | | |
|---|---|---|---|
| 6,525,547 B2 * | 2/2003 | Hayes ................. | G01D 5/2405 324/662 |
| 9,830,494 B2 * | 11/2017 | Chiang ................. | G06K 9/38 |
| 2012/0105081 A1 * | 5/2012 | Shaikh ................ | G06K 9/0002 324/686 |
| 2013/0135247 A1 * | 5/2013 | Na ........................ | G06F 21/32 345/174 |
| 2015/0195007 A1 * | 7/2015 | He ....................... | H04B 5/0012 455/41.1 |
| 2016/0291765 A1 * | 10/2016 | Shen .................... | G06F 3/0416 |
| 2017/0220182 A1 * | 8/2017 | Schwartz ............. | G06F 3/0416 |

(Continued)

*Primary Examiner* — Ping Y Hsieh

(57) ABSTRACT

A capacitive fingerprint sensing apparatus includes sensing electrodes, a sensing driver and a processing module. Under a first self-capacitive sensing mode, the sensing driver combines M adjacent sensing electrodes to form a first sensing electrode set to perform a first self-capacitive sensing to obtain a first self-capacitive fingerprint sensing signal; under a second self-capacitive sensing mode, the sensing driver combines N adjacent sensing electrodes to form a second sensing electrode set to perform a second self-capacitive sensing to obtain a second self-capacitive fingerprint sensing signal. M and N are positive integers larger than 1. The processing module generates a first self-capacitive fingerprint pattern and a second self-capacitive fingerprint pattern according to first self-capacitive fingerprint sensing signal and second self-capacitive fingerprint sensing signal and combines them into a third self-capacitive fingerprint pattern. The M adjacent sensing electrodes and the N adjacent sensing electrodes share at least one sensing electrode.

22 Claims, 15 Drawing Sheets

(56) References Cited

U.S. PATENT DOCUMENTS

2018/0113548 A1* 4/2018 Lee ...................... G06F 3/0412

* cited by examiner

CAPACITIVE FINGERPRINT SENSING APPARATUS

The present application is a continuation in part of U.S. patent application Ser. No. 15/206,587, filed Jul. 11, 2016, which claimed the benefit of provisional application 62/279,024, filed Jan. 15, 2016, the contents of which are incorporated by reference.

BACKGROUND OF THE INVENTION

1. Field of the Invention

This invention relates to fingerprint sensing, especially to a capacitive fingerprint sensing apparatus capable of providing good fingerprint sensing performance and high resolution at the same time.

2. Description of the Prior Art

With the developing of technology, the capacitive fingerprint sensing technology can be widely used in various kinds of electronic devices, especially portable electronic devices such as smart phones, notebook PCs and tablet PCs. Because the fingerprint sensing technology has high resolution requirement, the fingerprint sensing chip should have at least resolution of 500 dpi and its unit sensing area should be 50 um*50 um under the IAFIS standard.

Please refer to FIG. 1. As shown in FIG. 1, the conventional fingerprint sensor array is formed by sensing electrodes SE. It is assumed that the X-direction distance and the Y-direction distance between the sensing electrodes SE are Dx and Dy respectively; when the fingerprint sensing driver 12 drives the sensing electrodes SE to perform self-capacitive fingerprint sensing respectively, if the ridge of fingerprint presses on the sensing electrode SE, the sensing electrode SE will sense larger capacitance; if the valley of fingerprint presses on the sensing electrode SE, the sensing electrode SE will sense smaller capacitance. By doing so, the processing module 14 can obtain a self-capacitive fingerprint sensing pattern having a resolution of 1/Dx along the X direction and a resolution of 1/Dy along the Y direction according to the capacitances sensed by the sensing electrodes SE, wherein the unit pixels in the self-capacitive fingerprint sensing pattern will correspond to the sensing gravity center positions P of the sensing electrodes SE respectively. When Dx=Dy=50 μm, the resolution of the self-capacitive fingerprint sensing pattern will be 508 dpi higher than 500 dpi which can meet the requirement of the IAFIS standard.

Although the conventional self-capacitive fingerprint sensing technology can meet the requirement of the IAFIS standard, there will be a protection layer (e.g., sapphire glass) covering on the fingerprint sensor, so that the fingerprint sensor used in the portable electronic apparatus will not have poor fingerprint sensing effect due to the poor flatness caused by prolonged use or friction. However, because the protection layer usually has a thickness (e.g., 100 μm), if the fingerprint sensor array having a resolution of 500 dpi is used under this condition, the capacitance sensed by the fingerprint sensor array will be lower and easily interfered by noise; therefore, the performance of fingerprint identification will become poor. In order to increase the capacitance sensed by the fingerprint sensor, the size of the fingerprint sensor can be increased; however, the resolution will become lower at the same time.

From above, it can be found that the conventional self-capacitive fingerprint sensing technology fails to have good fingerprint sensing performance and high resolution at the same time. It is urgent to overcome this shortcoming.

SUMMARY OF THE INVENTION

Therefore, the invention provides a capacitive fingerprint sensing apparatus to solve the above-mentioned problems.

An embodiment of the invention is a capacitive fingerprint sensing apparatus. In this embodiment, the capacitive fingerprint sensing apparatus can be operated under a first self-capacitive sensing mode or a second self-capacitive sensing mode. The capacitive fingerprint sensing apparatus includes a plurality of sensing electrodes, a sensing driver and a processing module. The plurality of sensing electrodes is arranged in a regular manner. The sensing driver is coupled to the plurality of sensing electrodes. Under the first self-capacitive sensing mode, the sensing driver combines M adjacent sensing electrodes to form a first sensing electrode set to perform a first self-capacitive sensing to obtain a first self-capacitive fingerprint sensing signal; under the second self-capacitive sensing mode, the sensing driver combines N adjacent sensing electrodes to form a second sensing electrode set to perform a second self-capacitive sensing to obtain a second self-capacitive fingerprint sensing signal, wherein M and N are positive integers larger than 1. The processing module is coupled to the sensing driver. The processing module generates a first self-capacitive fingerprint pattern and a second self-capacitive fingerprint pattern according to the first self-capacitive fingerprint sensing signal and the second self-capacitive fingerprint sensing signal respectively and combines the first self-capacitive fingerprint pattern and the second self-capacitive fingerprint pattern into a third self-capacitive fingerprint pattern. Wherein, the M adjacent sensing electrodes forming the first sensing electrode set and the N adjacent sensing electrodes forming the second sensing electrode set share at least one sensing electrode.

In an embodiment, a resolution of the third self-capacitive fingerprint pattern along at least one direction is larger than resolutions of the first self-capacitive fingerprint pattern and the second self-capacitive fingerprint pattern along the at least one direction.

In an embodiment, sensing points of the first self-capacitive fingerprint pattern and sensing points of the second self-capacitive fingerprint pattern are interlaced to make a resolution of the third self-capacitive fingerprint pattern larger than a resolution of the first self-capacitive fingerprint pattern or a resolution of the second self-capacitive fingerprint pattern.

In an embodiment, the M adjacent sensing electrodes forming the first sensing electrode set are adjacent to each other along a horizontal direction, a vertical direction or an oblique direction.

In an embodiment, the N adjacent sensing electrodes forming the second sensing electrode set are adjacent to each other along a horizontal direction, a vertical direction or an oblique direction.

In an embodiment, the M adjacent sensing electrodes forming the first sensing electrode set are arranged as a matrix including P rows of sensing electrodes and Q columns of sensing electrodes, wherein M is a product of P and Q.

In an embodiment, the N adjacent sensing electrodes forming the second sensing electrode set are arranged as a matrix including R rows of sensing electrodes and S columns of sensing electrodes, wherein N is a product of R and S.

In an embodiment, the plurality of sensing electrodes has arbitrary geometries.

In an embodiment, the plurality of sensing electrodes has the same size and shape, or the plurality of sensing electrodes has different sizes and shapes.

In an embodiment, the regular manner that the plurality of sensing electrodes is arranged in is a matrix arrangement, a triangle arrangement or an interlacing arrangement.

In an embodiment, the capacitive fingerprint sensing apparatus includes a switching module coupled between the sensing driver and the processing module and configured to selectively switch to the first self-capacitive sensing mode or the second self-capacitive sensing mode and transmit the first self-capacitive fingerprint sensing signal and the second self-capacitive fingerprint sensing signal to the processing module.

In an embodiment, the capacitive fingerprint sensing apparatus includes an amplifying module coupled between the switching module and the processing module and configured to amplify the first self-capacitive fingerprint sensing signal and the second self-capacitive fingerprint sensing signal and then transmit the amplified first self-capacitive fingerprint sensing signal and the amplified second self-capacitive fingerprint sensing signal to the processing module.

In an embodiment, under the first self-capacitive sensing mode and the second self-capacitive sensing mode, sensing electrodes without performing self-capacitive sensing in the plurality of sensing electrodes are coupled to a shielding signal to avoid noise interference from outside.

In an embodiment, the shielding signal is a direct-current (DC) signal, an alternating-current (AC) signal, a ground signal or a sensing related signal.

In an embodiment, the capacitive fingerprint sensing apparatus includes another sensing driver having a timing complementary to a timing of the sensing driver, the sensing electrodes without performing self-capacitive sensing in the plurality of sensing electrodes are coupled to the shielding signal through the another sensing driver.

In an embodiment, the capacitive fingerprint sensing apparatus includes a scanning driver coupled to columns of sensing electrodes in the plurality of sensing electrodes through a plurality of scanning lines respectively.

In an embodiment, the scanning driver drives the columns of sensing electrodes through the plurality of scanning lines in a continuous order.

In an embodiment, the scanning driver only uses one scanning line in the plurality of scanning lines to drive one corresponding column of sensing electrodes in the columns of sensing electrodes at one time.

In an embodiment, the scanning driver uses at least two scanning lines in the plurality of scanning lines to drive at least two corresponding columns of sensing electrodes in the columns of sensing electrodes at one time.

In an embodiment, the scanning driver drives the columns of sensing electrodes through the plurality of scanning lines in a discontinuous order.

In an embodiment, the scanning driver only uses one scanning line in the plurality of scanning lines to drive one corresponding column of sensing electrodes in the columns of sensing electrodes at one time.

In an embodiment, the scanning driver uses at least two scanning lines in the plurality of scanning lines to drive at least two corresponding columns of sensing electrodes in the columns of sensing electrodes at one time.

Compared to the prior art, the capacitive fingerprint sensing apparatus of the invention uses different self-capacitive sensing electrode sets sharing at least one sensing electrode to perform self-capacitive sensing to obtain different self-capacitive fingerprint sensing patterns respectively and then combines these self-capacitive fingerprint sensing patterns into a combined fingerprint sensing pattern having a resolution larger than the resolutions of these self-capacitive fingerprint sensing patterns along at least one direction.

Therefore, the capacitive fingerprint sensing apparatus of the invention can effectively increase the capacitance sensed by unit sensing electrode without decreasing the resolution, so that it can have good fingerprint sensing performance and high resolution at the same time to overcome the drawbacks and limitations of the conventional self-capacitive fingerprint sensing technology.

The advantage and spirit of the invention may be understood by the following detailed descriptions together with the appended drawings.

BRIEF DESCRIPTION OF THE APPENDED DRAWINGS

Figure 1:
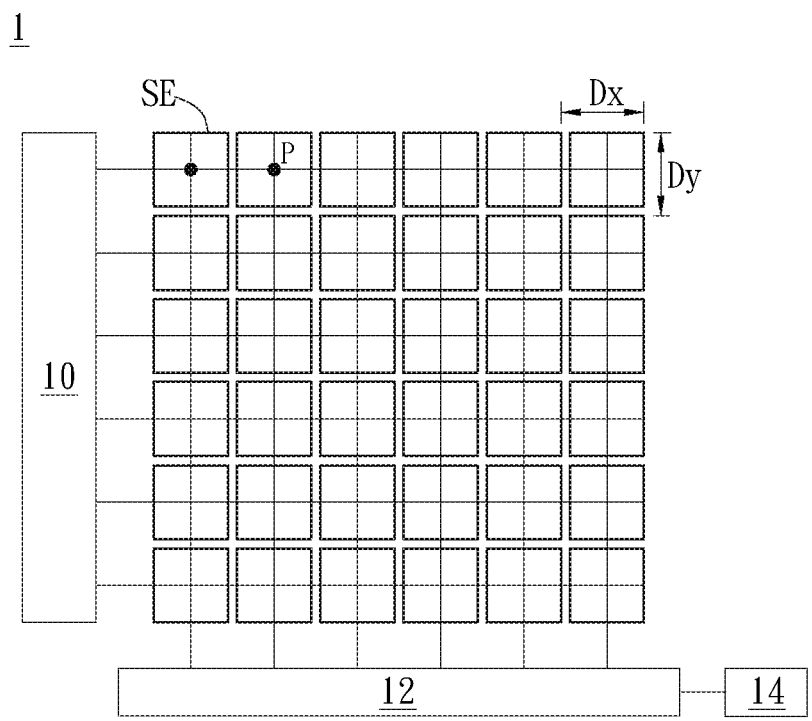
FIG. 1 illustrates a schematic diagram of the conventional capacitive fingerprint sensing apparatus.
Figure 2A:
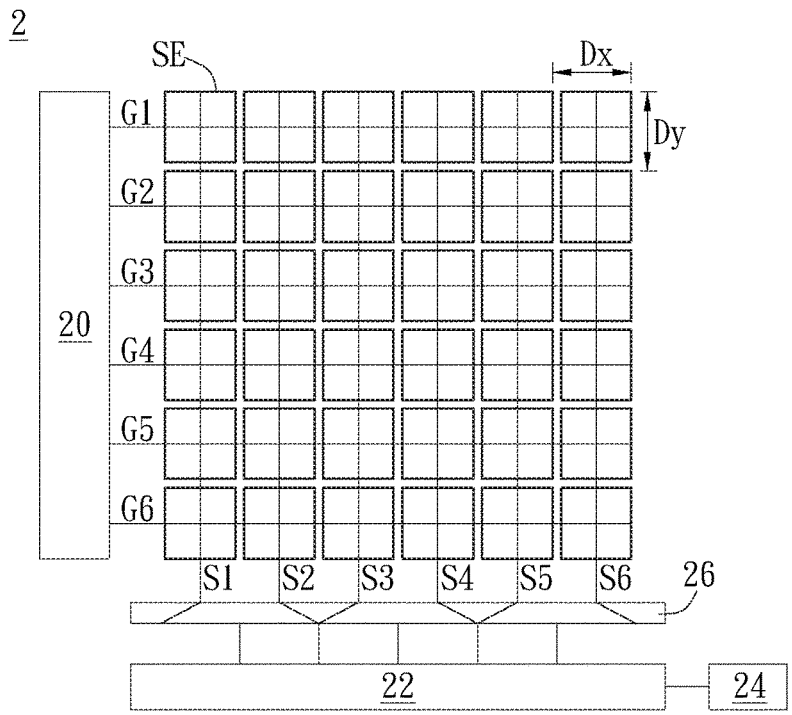
FIG. 2A illustrates a schematic diagram of the capacitive fingerprint sensing apparatus in an embodiment of the invention.
Figure 2B:
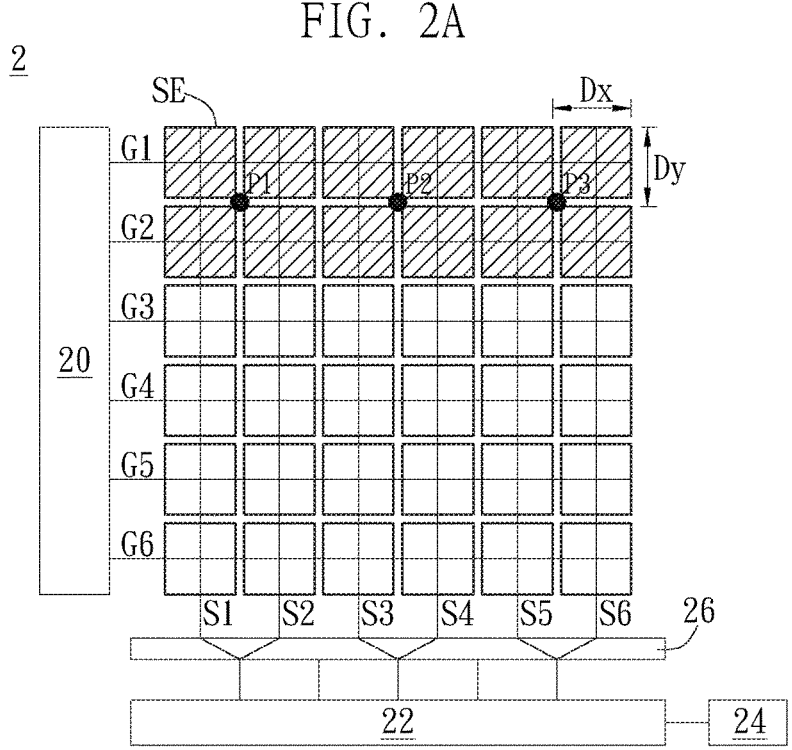
FIG. 2B illustrates a schematic diagram of the capacitive fingerprint sensing apparatus operated under the first self-capacitive sensing mode during the time period T1 performing self-capacitive sensing to obtain self-capacitive fingerprint sensing signal having sensing gravity center positions P1~P3.
Figure 2C:
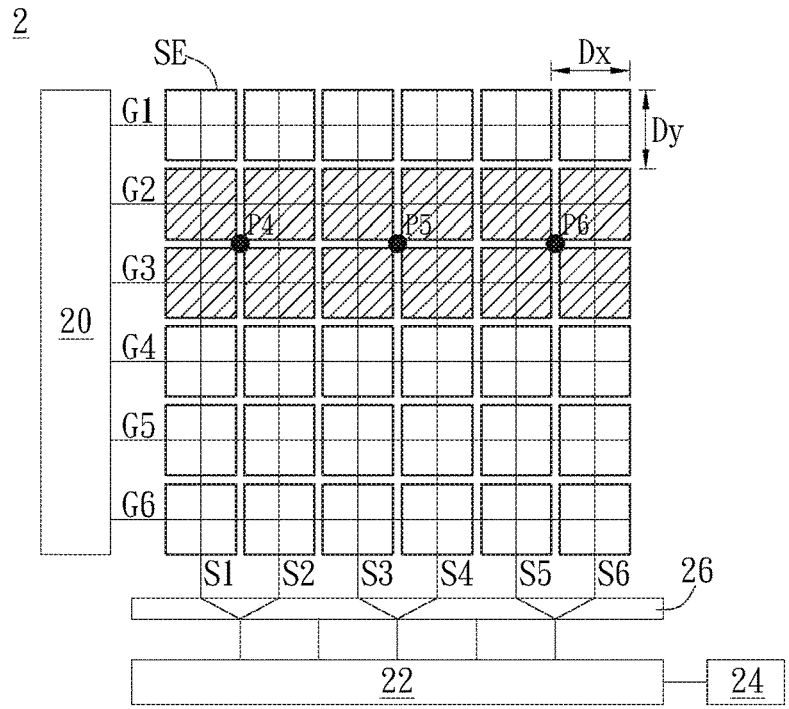
FIG. 2C illustrates a schematic diagram of the capacitive fingerprint sensing apparatus operated under the first self-capacitive sensing mode during the time period T2 performing self-capacitive sensing to obtain self-capacitive fingerprint sensing signal having sensing gravity center positions P4~P6.
Figure 2D:
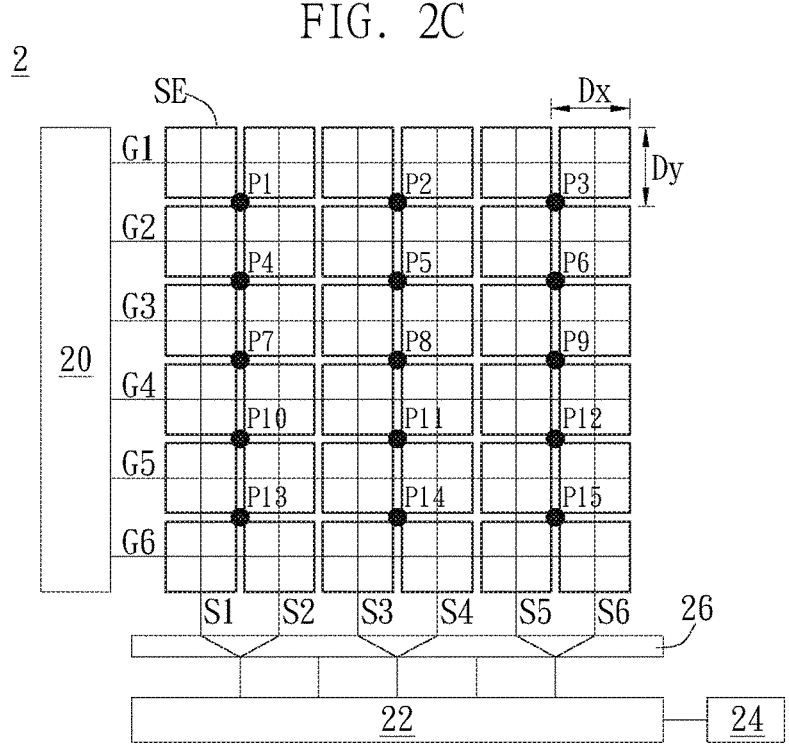
FIG. 2D illustrates a schematic diagram of the capacitive fingerprint sensing apparatus operated under the first self-capacitive sensing mode during the time periods T1~T5 performing self-capacitive sensing to obtain the first self-capacitive fingerprint sensing signal having sensing gravity center positions P1~P15.
Figure 2E:
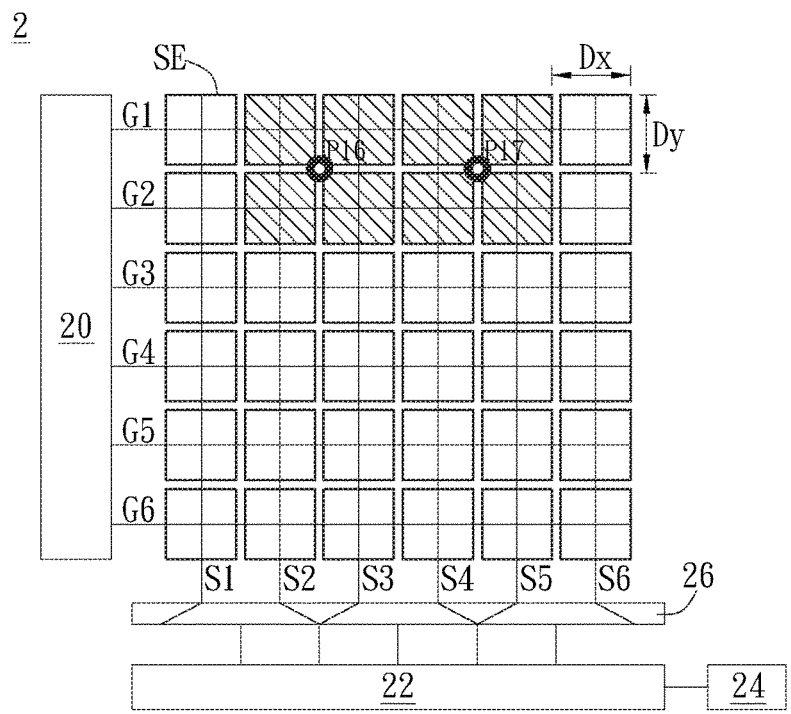
FIG. 2E illustrates a schematic diagram of the capacitive fingerprint sensing apparatus operated under the second self-capacitive sensing mode during the time period T6 performing self-capacitive sensing to obtain self-capacitive fingerprint sensing signal having sensing gravity center positions P16~P17.
Figure 2F:
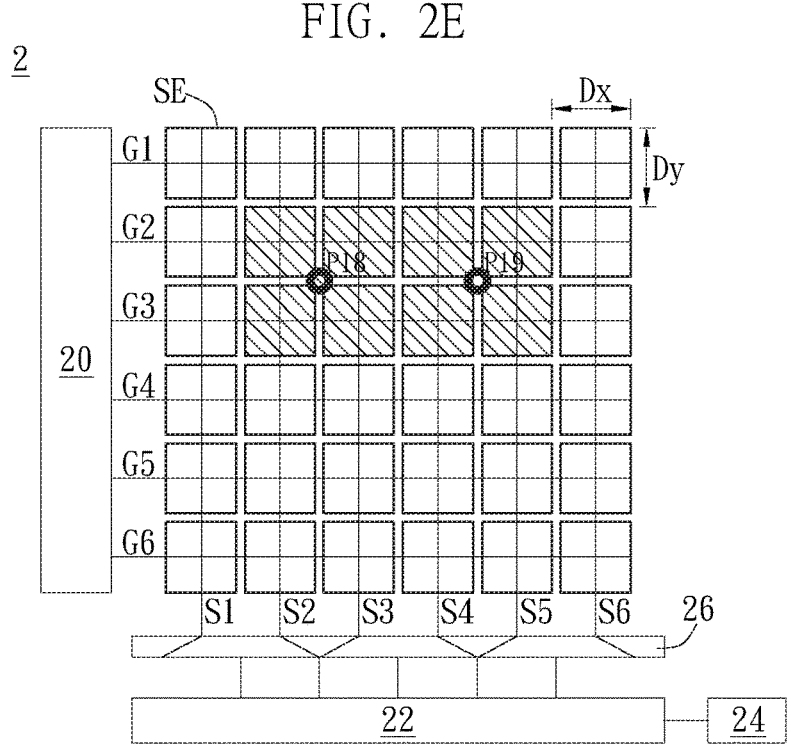
FIG. 2F illustrates a schematic diagram of the capacitive fingerprint sensing apparatus operated under the second self-capacitive sensing mode during the time period T7 performing self-capacitive sensing to obtain self-capacitive fingerprint sensing signal having sensing gravity center positions P18~P19.
Figure 2G:
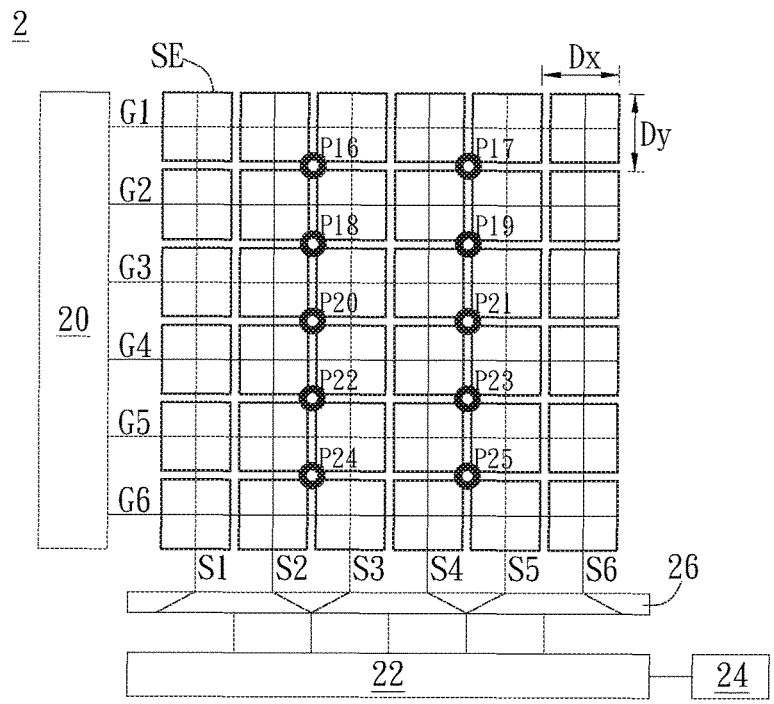
FIG. 2G illustrates a schematic diagram of the capacitive fingerprint sensing apparatus operated under the second self-capacitive sensing mode during the time periods T6~T10 performing self-capacitive sensing to obtain the second self-capacitive fingerprint sensing signal having sensing gravity center positions P16~P25.
Figure 2H:
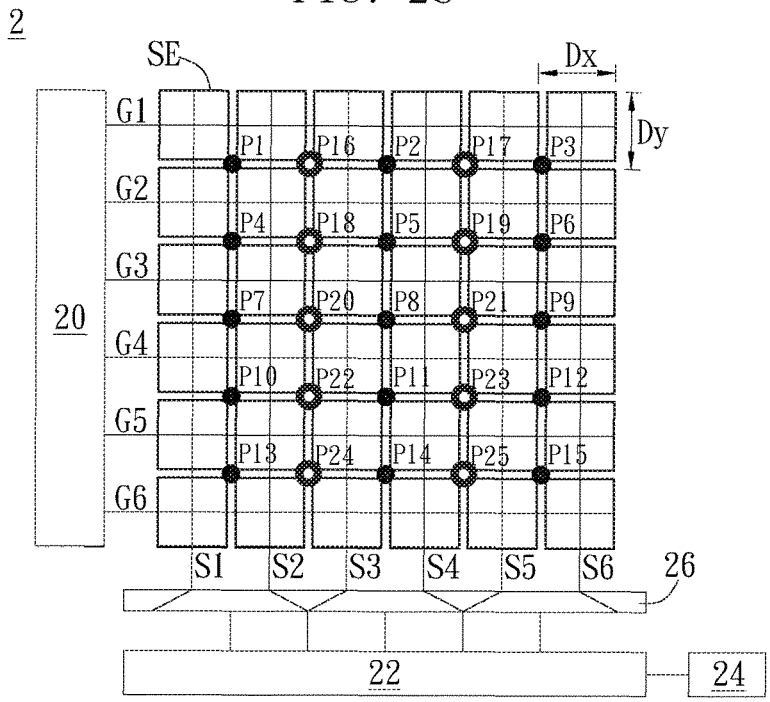

FIG. 2H illustrates a schematic diagram of the third self-capacitive fingerprint pattern having sensing gravity center positions P1~P25 obtained by combining the first self-capacitive fingerprint pattern and the second self-capacitive fingerprint pattern obtained by the capacitive fingerprint sensing apparatus operated under the first self-capacitive sensing mode and the second self-capacitive sensing mode respectively.

Figure 3A:
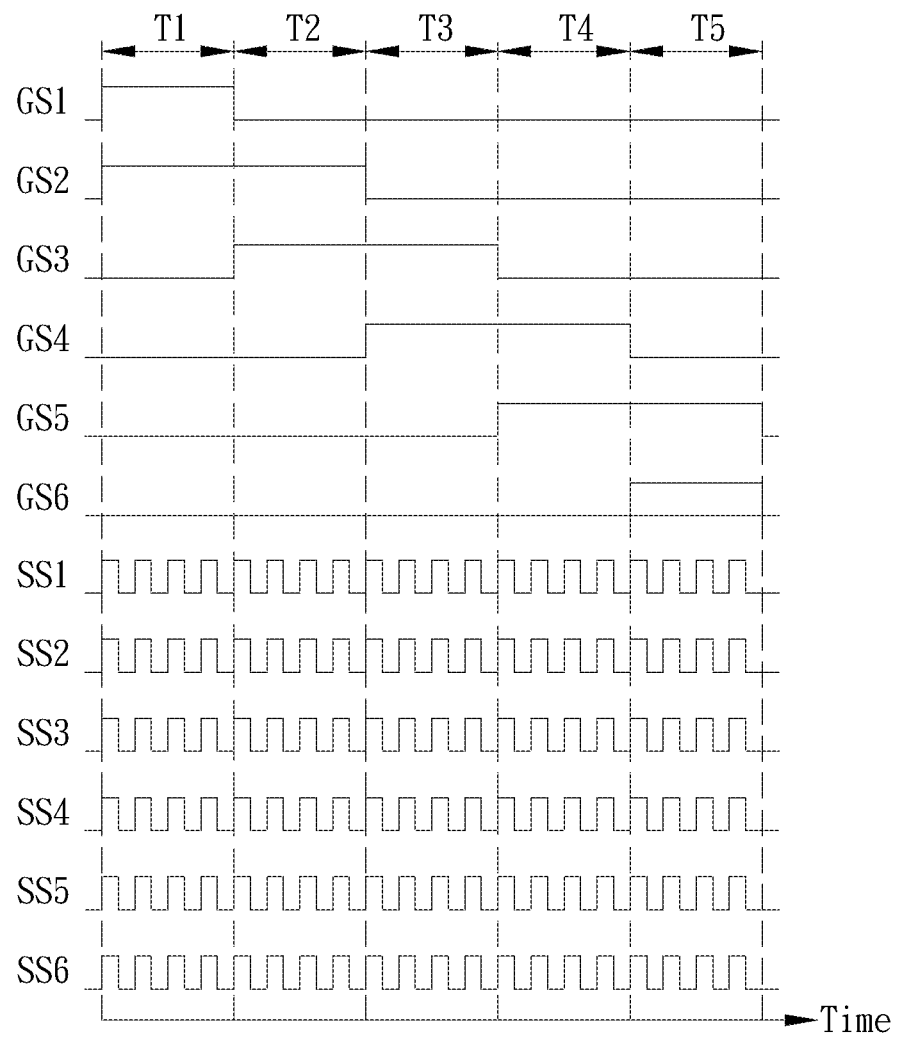

FIG. 3A illustrates a timing diagram of the scan driving signals GS1~GS6 and the sense driving signals SS1~SS6 during the time periods T1~T5.

Figure 3B:
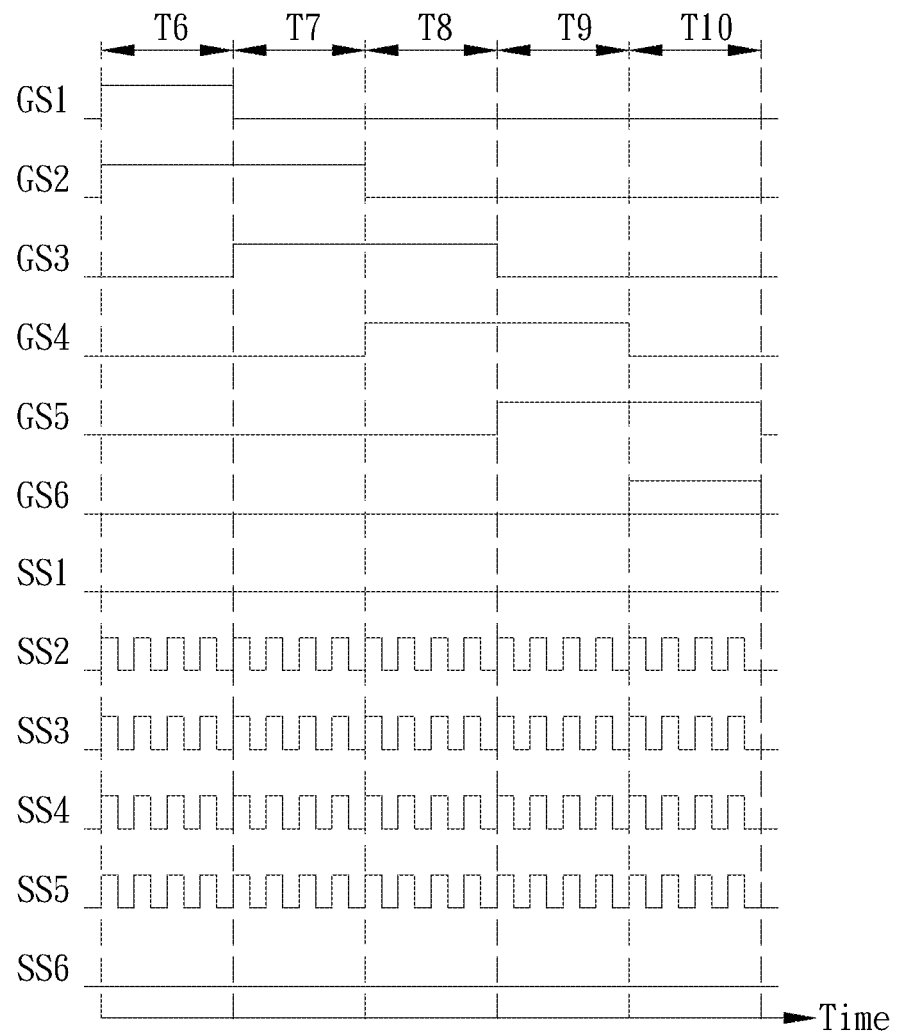

FIG. 3B illustrates a timing diagram of the scan driving signals GS1~GS6 and the sense driving signals SS1~SS6 during the time periods T6~T10.

FIG. 4A~FIG. 4D illustrate another embodiment of the capacitive fingerprint sensing apparatus of the invention.

Figure 5A:
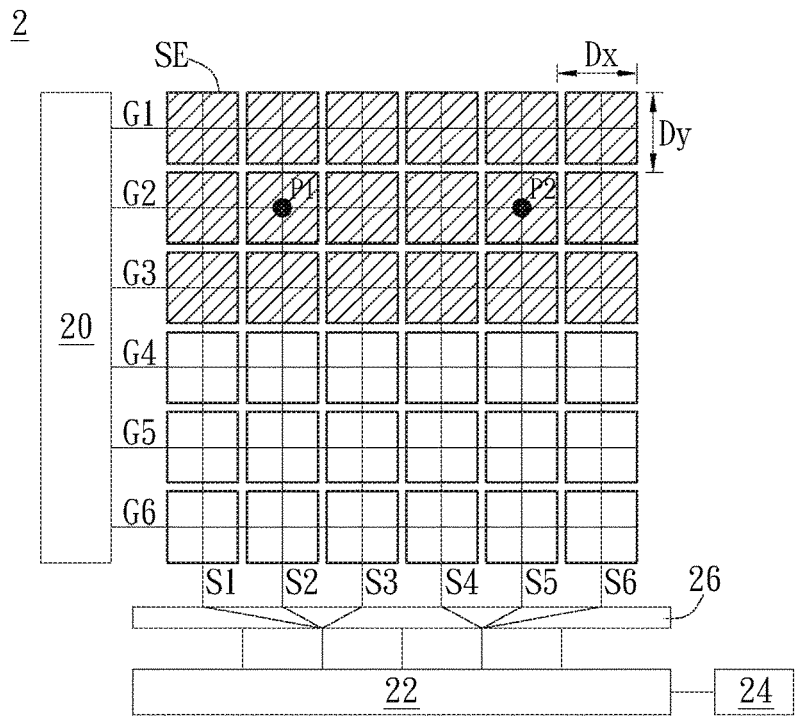
Figure 5B:
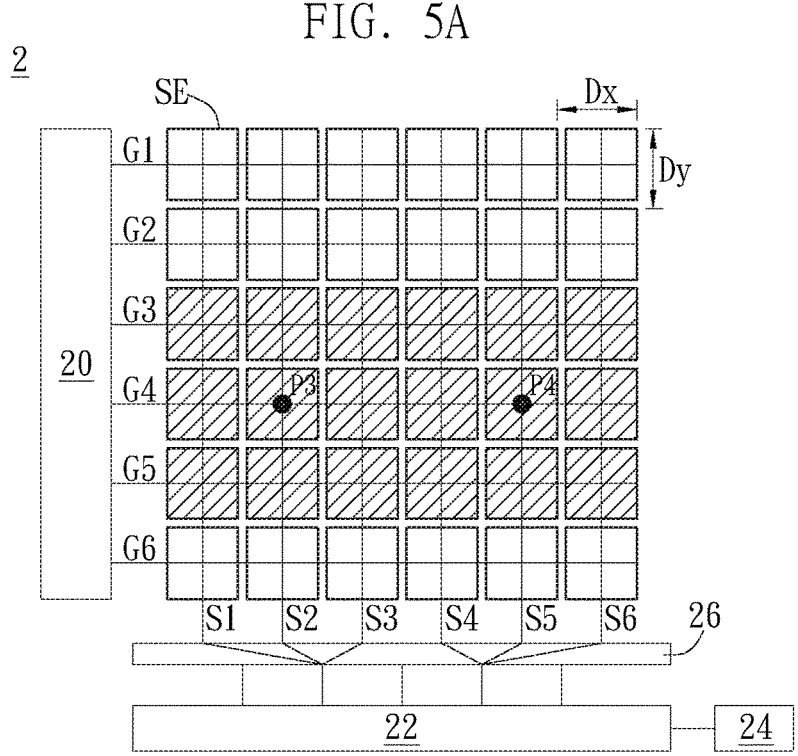

FIG. 5A~FIG. 5B illustrate another embodiment of the capacitive fingerprint sensing apparatus of the invention.

Figure 6:
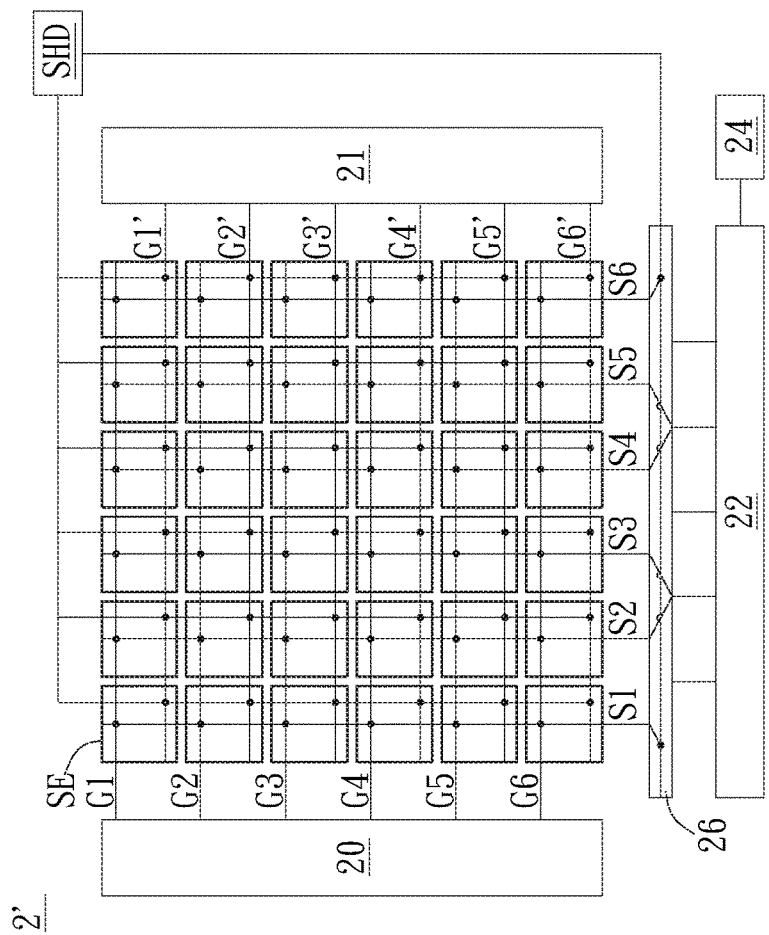

FIG. 6 illustrates a schematic diagram of the capacitive fingerprint sensing apparatus including two scanning drivers in another embodiment of the invention.

Figure 7:
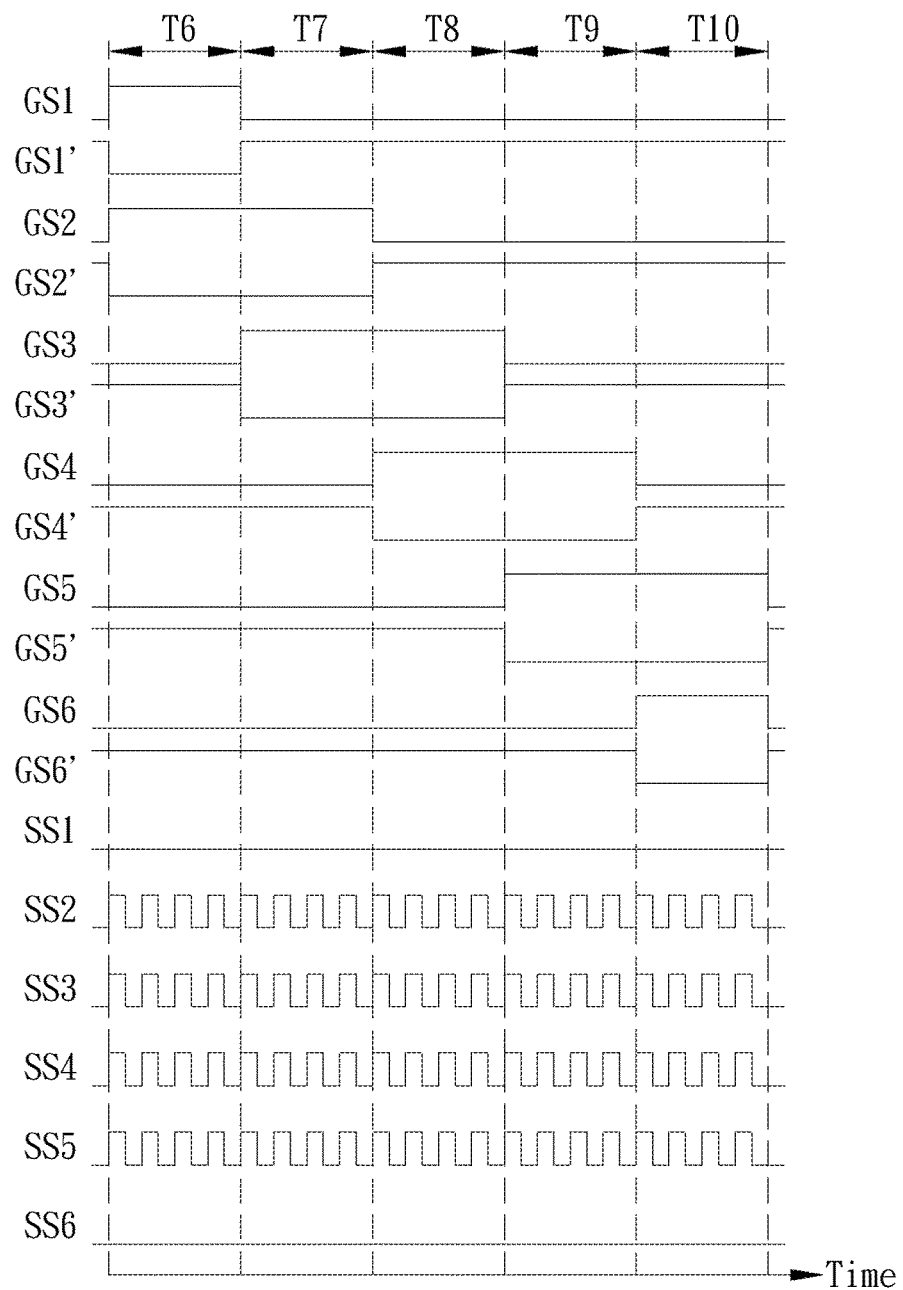
Figure 8A:
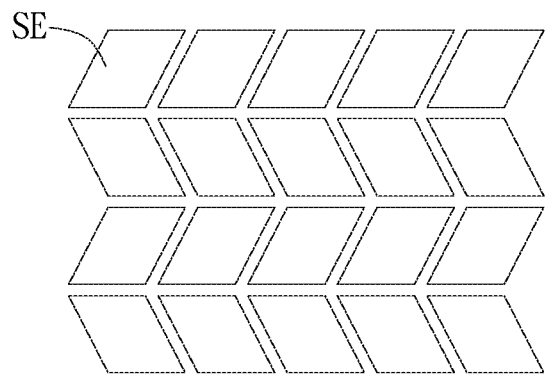
Figure 8B:
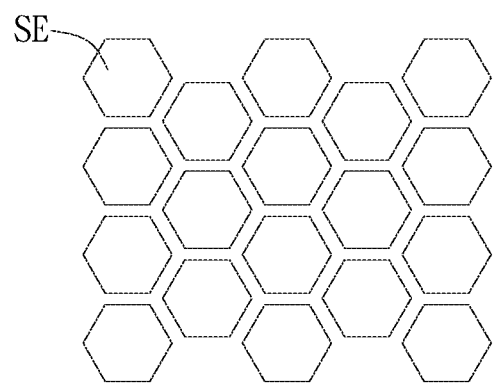
Figure 8C:
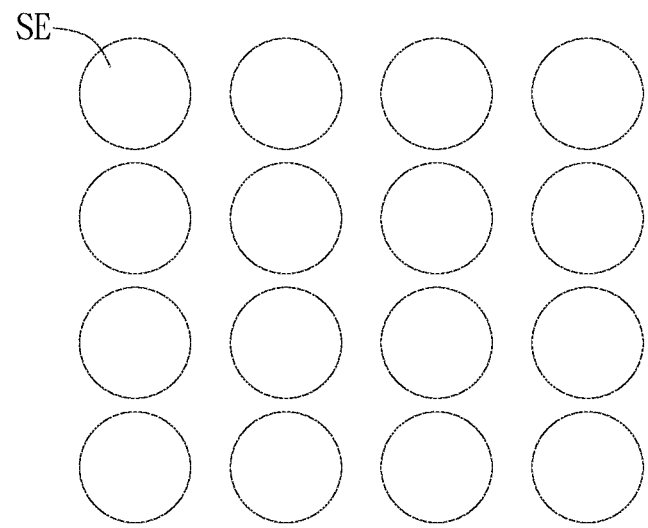
Figure 8D:
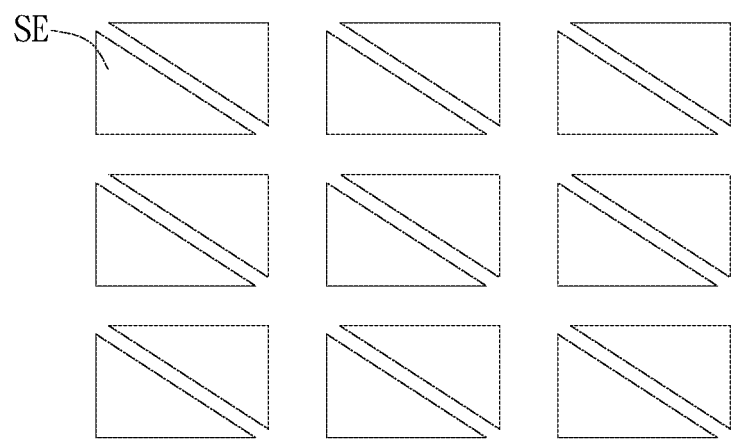

FIG. 7 illustrates a timing diagram of the sense driving signals SS1~SS6 and the scan driving signals GS1~GS6 and GS1'~GS6' which are inverting each other during the time periods T6~T10.

FIG. 8A~FIG. 8D illustrate schematic diagrams of the sensing electrodes arranged in a regular manner and the sensing electrodes can have the same size or shape or have different sizes or shapes.

Figure 9A:
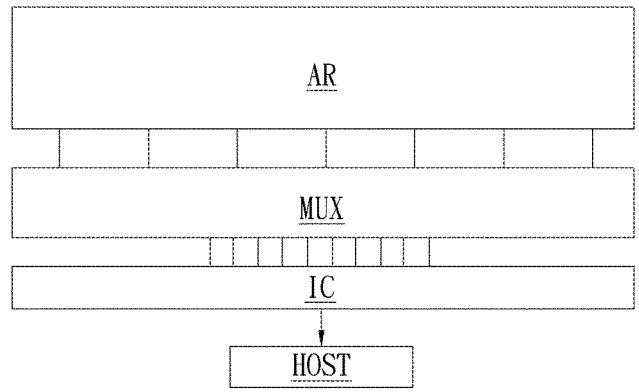

FIG. 9A illustrates a schematic diagram of the fingerprint sensing array AR coupled to the host HOST through the multiplexer MUX and the controller IC.

Figure 9B:
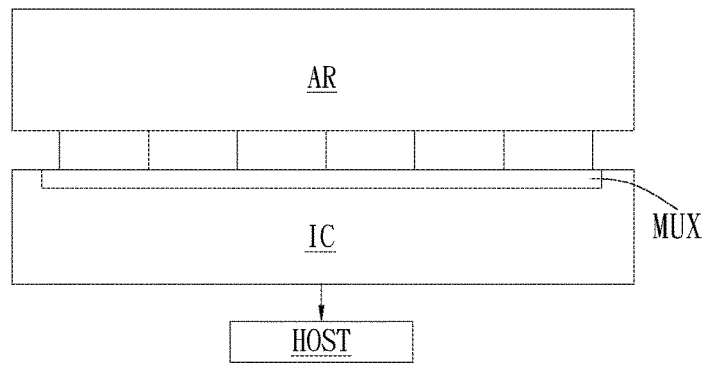

FIG. 9B illustrates a schematic diagram of the fingerprint sensing array AR coupled to the host HOST through the multiplexer MUX disposed in the controller IC.

Figure 9C:
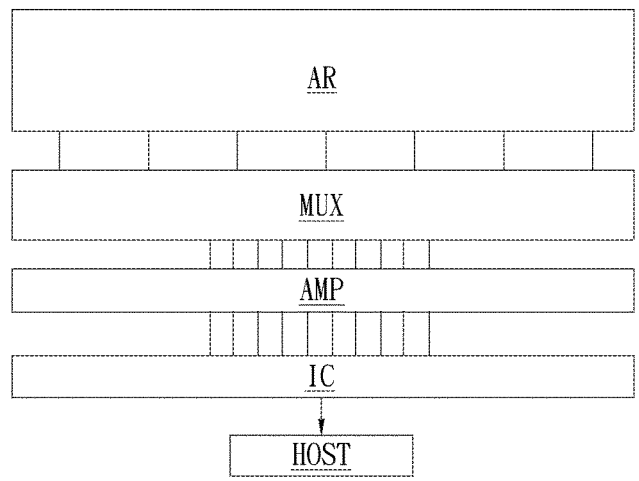

FIG. 9C illustrates a schematic diagram of the fingerprint sensing array AR coupled to the host HOST through the multiplexer MUX, the amplifying module AMP and the controller IC.

DETAILED DESCRIPTION OF THE INVENTION

A preferred embodiment of the invention is a capacitive fingerprint sensing apparatus. In this embodiment, the capacitive fingerprint sensing apparatus can be operated under a first self-capacitive sensing mode or a second self-capacitive sensing mode. The capacitive fingerprint sensing apparatus includes a plurality of sensing electrodes, a sensing driver and a processing module. The sensing driver is coupled to the plurality of sensing electrodes. The processing module is coupled to the sensing driver. The plurality of sensing electrodes is arranged in a regular manner.

Under the first self-capacitive sensing mode, the sensing driver combines M adjacent sensing electrodes to form a first sensing electrode set to perform a first self-capacitive sensing to obtain a first self-capacitive fingerprint sensing signal, wherein the M adjacent sensing electrodes forming the first sensing electrode set are adjacent to each other along a horizontal direction, a vertical direction or an oblique direction; under the second self-capacitive sensing mode, the sensing driver combines N adjacent sensing electrodes to form a second sensing electrode set to perform a second self-capacitive sensing to obtain a second self-capacitive fingerprint sensing signal, wherein the N adjacent sensing electrodes forming the second sensing electrode set are adjacent to each other along a horizontal direction, a vertical direction or an oblique direction.

It should be noticed that M and N are positive integers larger than 1, and the M adjacent sensing electrodes forming the first sensing electrode set and the N adjacent sensing electrodes forming the second sensing electrode set share at least one sensing electrode. That is to say, at least one sensing electrode in the first sensing electrode set performing self-capacitive sensing under the first self-capacitive sensing mode will be also used to perform self-capacitive sensing under the second self-capacitive sensing mode.

Then, the processing module will generate a first self-capacitive fingerprint pattern and a second self-capacitive fingerprint pattern according to the first self-capacitive fingerprint sensing signal and the second self-capacitive fingerprint sensing signal respectively and combine the first self-capacitive fingerprint pattern and the second self-capacitive fingerprint pattern into a third self-capacitive fingerprint pattern. Wherein, a resolution of the third self-capacitive fingerprint pattern along at least one direction is larger than resolutions of the first self-capacitive fingerprint pattern and the second self-capacitive fingerprint pattern along the at least one direction.

That is to say, since the sensing points of the first self-capacitive fingerprint pattern and the sensing points of the second self-capacitive fingerprint pattern are interlaced and complementary, after the processing module combines the first self-capacitive fingerprint pattern and the second self-capacitive fingerprint pattern into the third self-capacitive fingerprint pattern, the resolution of the combined self-capacitive fingerprint pattern (the third self-capacitive fingerprint pattern) will be higher than the resolution of the first self-capacitive fingerprint pattern or the resolution of the second self-capacitive fingerprint pattern. Therefore, the resolution of the fingerprint sensing pattern can be enhanced.

Next, different embodiments will be used to introduce the practical operation of the capacitive fingerprint sensing apparatus of the invention.

At first, please refer to FIG. 2A. FIG. 2A illustrates a schematic diagram of the capacitive fingerprint sensing apparatus in an embodiment of the invention. As shown in FIG. 2A, the capacitive fingerprint sensing apparatus 2 includes a scanning driver 20, a sensing driver 22, a processing module 24, a switching module 26 and a plurality of sensing electrodes SE. In this embodiment, the capacitive fingerprint sensing apparatus 2 can be operated in the first self-capacitive sensing mode or the second self-capacitive sensing mode. The plurality of sensing electrodes SE is arranged in a form of (6×6) matrix including six rows of sensing electrodes arranged along the vertical direction and six columns of sensing electrodes arranged along the horizontal direction. The scanning driver 20 is coupled to the first column of sensing electrodes~the sixth column of sensing electrodes through the scanning lines G1~G6 respectively; the switching module 26 is coupled to the first row of sensing electrodes~the sixth row of sensing electrodes through the sensing lines S1~S6 respectively and the switching module 26 selectively switches the switching module 26 to couple with the sensing driver 22 or not, but not limited to this.

In practical applications, the scanning driver 20 can drive the first column of sensing electrodes~the sixth column of sensing electrodes through the scanning lines G1~G6 in a continuous order or a discontinuous order. At one time, the scanning driver 20 can only use one scanning line (e.g., the scanning line G1) in the scanning lines G1~G6 to drive one corresponding column of sensing electrodes (e.g., the first column of sensing electrodes) in the first column of sensing electrodes~the sixth column of sensing electrodes, or the scanning driver 20 can use at least two scanning lines (e.g., the scanning lines G1~G2) in the scanning lines G1~G6 to drive at least two corresponding columns of sensing electrodes (e.g., the first column of sensing electrodes and the second column of sensing electrodes) without any specific limitations depending on practical needs.

Then, please refer to FIG. 2B and FIG. 3A. FIG. 2B illustrates a schematic diagram of the capacitive fingerprint sensing apparatus 2 operated under the first self-capacitive sensing mode during the time period T1 performing self-capacitive sensing to obtain self-capacitive fingerprint sensing signal having sensing gravity center positions P1~P3; FIG. 3A illustrates a timing diagram of the scan driving signals GS1~GS6 and the sense driving signals SS1~SS6 during the time period T1.

As shown in FIG. 3A, during the time period T1, among the scan driving signals GS1~GS6 outputted by the scanning driver 20 to the scanning lines G1~G6, only the scan driving signals GS1 and GS2 are at high level and other scan driving signals GS3~GS6 are at low level. That is to say, during the time period T1, the scanning driver 20 will only drive the scanning lines G1 and G2 coupled to the first column of sensing electrodes and the second column of sensing electrodes respectively. As to the switching module 26, during the time period T1, the switching module 26 will switch the sensing lines S1~S6 to make the sensing lines S1~S2, the sensing lines S3~S4 and the sensing lines S5~S6 coupled together to the sensing driver 22 respectively. Therefore, the sense driving signals SS1~SS6 can be transmitted to the first row of sensing electrodes~the sixth row of sensing electrodes through the sensing lines S1~S6 respectively.

As shown in FIG. 2B, during the time period T1, four sensing electrodes corresponding to the scanning lines G1~G2 and sensing lines S1~S2 will be electrically coupled as a sensing electrode set having a sensing gravity center position P1; four sensing electrodes corresponding to the scanning lines G1~G2 and sensing lines S3~S4 will be electrically coupled as a sensing electrode set having a sensing gravity center position P2; four sensing electrodes corresponding to the scanning lines G1~G2 and sensing lines S5~S6 will be electrically coupled as a sensing electrode set having a sensing gravity center position P3.

Similarly, please refer to FIG. 2C and FIG. 3A. FIG. 2C illustrates a schematic diagram of the capacitive fingerprint sensing apparatus 2 operated under the first self-capacitive sensing mode during the time period T2 performing self-capacitive sensing to obtain self-capacitive fingerprint sensing signal having sensing gravity center positions P4~P6; FIG. 3A illustrates a timing diagram of the scan driving signals GS1~GS6 and the sense driving signals SS1~SS6 during the time period T2.

As shown in FIG. 3A, during the time period T2, among the scan driving signals GS1~GS6 outputted by the scanning driver 20 to the scanning lines G1~G6, only the scan driving signals GS2 and GS3 are at high level and other scan driving signals GS1, GS4~GS6 are at low level. That is to say, during the time period T2, the scanning driver 20 will only drive the scanning lines G2 and G3 coupled to the second column of sensing electrodes and the third column of sensing electrodes respectively. As to the switching module 26, during the time period T2, the switching module 26 will maintain the sensing lines S1~S2, the sensing lines S3~S4 and the sensing lines S5~S6 coupled together to the sensing driver 22 respectively. Therefore, the sense driving signals SS1~SS6 can be transmitted to the first row of sensing electrodes~the sixth row of sensing electrodes through the sensing lines S1~S6 respectively.

As shown in FIG. 2C, during the time period T2, four sensing electrodes corresponding to the scanning lines G2~G3 and sensing lines S1~S2 will be electrically coupled as a sensing electrode set having a sensing gravity center position P4; four sensing electrodes corresponding to the scanning lines G2~G3 and sensing lines S3~S4 will be electrically coupled as a sensing electrode set having a sensing gravity center position P5; four sensing electrodes corresponding to the scanning lines G2~G3 and sensing lines S5~S6 will be electrically coupled as a sensing electrode set having a sensing gravity center position P6.

Then, since the conditions during the time periods T3~T5 will be similar as above, it will not repeat here.

After the capacitive fingerprint sensing apparatus 2 is operated under the first self-capacitive sensing mode to perform self-capacitive sensing during the time periods T1~T5 in order, the first self-capacitive fingerprint sensing signal having sensing gravity center positions P1~P15 as shown in FIG. 2D will be obtained, and the processing module 24 will obtain a first self-capacitive fingerprint sensing pattern according to the first self-capacitive fingerprint sensing signal.

Then, please refer to FIG. 2E and FIG. 3B. FIG. 2E illustrates a schematic diagram of the capacitive fingerprint sensing apparatus 2 operated under the second self-capacitive sensing mode during the time period T6 performing self-capacitive sensing to obtain self-capacitive fingerprint sensing signal having sensing gravity center positions P16~P17; FIG. 3B illustrates a timing diagram of the scan driving signals GS1~GS6 and the sense driving signals SS1~SS6 during the time period T6.

As shown in FIG. 3B, during the time period T6, among the scan driving signals GS1~GS6 outputted by the scanning driver 20 to the scanning lines G1~G6, only the scan driving signals GS1 and GS2 are at high level and other scan driving signals GS3~GS6 are at low level. That is to say, during the time period T6, the scanning driver 20 will only drive the scanning lines G1 and G2 coupled to the first column of sensing electrodes and the second column of sensing electrodes respectively. As to the switching module 26, during the time period T6, the switching module 26 will switch the sensing lines S1~S6 to make the sensing lines S2~S3 and the sensing lines S4~S5 coupled together to the sensing driver 22 respectively, but the sensing lines S1 and S6 are not coupled to the sensing driver 22. Therefore, only the sense driving signals SS2~SS5 of the sense driving signals SS1~SS6 can be transmitted to the second row of sensing electrodes~the fifth row of sensing electrodes through the sensing lines S2~S5 respectively, but the sensing lines S1 and S6 will not transmit the driving signals SS1 and SS6 to the first row of sensing electrodes and the sixth row of sensing electrodes respectively.

As shown in FIG. 2E, during the time period T6, four sensing electrodes corresponding to the scanning lines G1~G2 and sensing lines S2~S3 will be electrically coupled as a sensing electrode set having a sensing gravity center position P16; four sensing electrodes corresponding to the scanning lines G1~G2 and sensing lines S4~S5 will be electrically coupled as a sensing electrode set having a sensing gravity center position P17.

Similarly, please refer to FIG. 2F and FIG. 3B. FIG. 2F illustrates a schematic diagram of the capacitive fingerprint sensing apparatus 2 operated under the second self-capacitive sensing mode during the time period T7 performing self-capacitive sensing to obtain self-capacitive fingerprint sensing signal having sensing gravity center positions P18~P19; FIG. 3B illustrates a timing diagram of the scan driving signals GS1~GS6 and the sense driving signals SS1~SS6 during the time period T7.

As shown in FIG. 3B, during the time period T7, among the scan driving signals GS1~GS6 outputted by the scanning driver 20 to the scanning lines G1~G6, only the scan driving signals GS2 and GS3 are at high level and other scan driving signals GS1, GS4~GS6 are at low level. That is to say, during the time period T7, the scanning driver 20 will only drive the scanning lines G2 and G3 coupled to the second column of sensing electrodes and the third column of sensing electrodes respectively. As to the switching module 26, during the time period T7, the switching module 26 will maintain the sensing lines S2~S3 and the sensing lines S4~S5 coupled together to the sensing driver 22 respectively, but the sensing lines S1 and S6 are not coupled to the sensing driver 22. Therefore, only the sense driving signals SS2~SS5 of the sense driving signals SS1~SS6 can be transmitted to the second row of sensing electrodes~the fifth row of sensing electrodes through the sensing lines S2~S5 respectively, but the sensing lines S1 and S6 will not transmit the driving signals SS1 and SS6 to the first row of sensing electrodes and the sixth row of sensing electrodes respectively.

As shown in FIG. 2F, during the time period T7, four sensing electrodes corresponding to the scanning lines G2~G3 and sensing lines S2~S3 will be electrically coupled as a sensing electrode set having a sensing gravity center position P18; four sensing electrodes corresponding to the scanning lines G2~G3 and sensing lines S4~S5 will be electrically coupled as a sensing electrode set having a sensing gravity center position P19.

Then, since the conditions during the time periods T8~T10 will be similar as above, it will not repeat here.

After the capacitive fingerprint sensing apparatus 2 is operated under the second self-capacitive sensing mode to perform self-capacitive sensing during the time periods T6~T10 in order, the second self-capacitive fingerprint sensing signal having sensing gravity center positions P16~P25 as shown in FIG. 2G will be obtained, and the processing module 24 will obtain a second self-capacitive fingerprint sensing pattern according to the second self-capacitive fingerprint sensing signal.

Then, as shown in FIG. 2H, the processing module 24 can combine the first self-capacitive fingerprint pattern obtained by the capacitive fingerprint sensing apparatus 2 under the first self-capacitive sensing mode and the second self-capacitive fingerprint pattern obtained by the capacitive fingerprint sensing apparatus 2 under the second self-capacitive sensing mode into a third self-capacitive fingerprint pattern having the sensing gravity center positions P1~P25. After comparing FIG. 2D, FIG. 2G with FIG. 2H, it can be found that the resolutions of the third self-capacitive fingerprint pattern along the horizontal direction, the vertical direction and the oblique direction are obviously higher than the resolutions of the first self-capacitive fingerprint pattern and the second self-capacitive fingerprint pattern along the horizontal direction, the vertical direction and the oblique direction. Therefore, the requirement of high resolution should be achieved.

Then, please refer to FIG. 4A~FIG. 4D. FIG. 4A~FIG. 4D illustrate another embodiment of the capacitive fingerprint sensing apparatus of the invention.

Figure 4A:
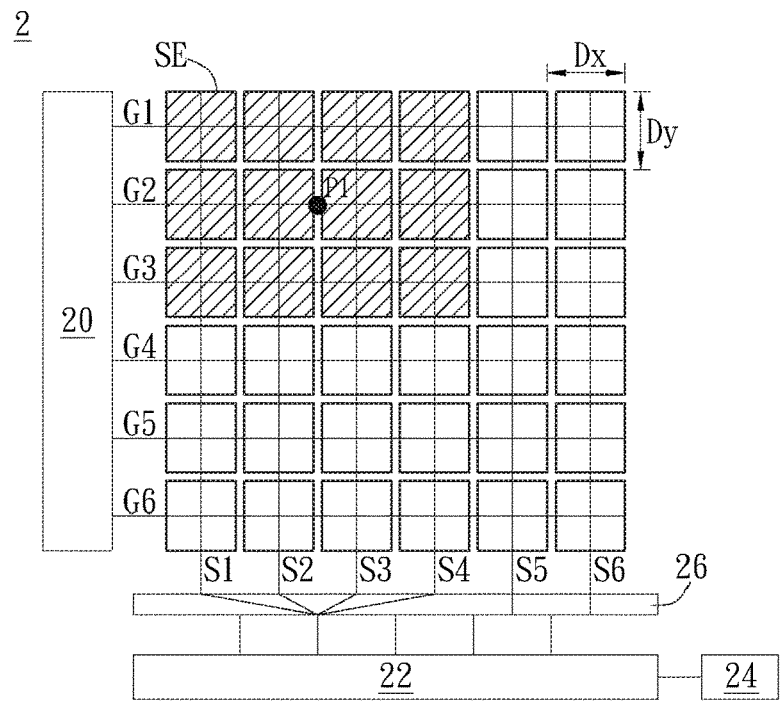

The difference between this embodiment and the above-mentioned embodiments is that when the capacitive fingerprint sensing apparatus 2 of this embodiment is operated under the first self-capacitive sensing mode, as shown in FIG. 4A, during the time period T1, the scan driving signals GS1~GS3 outputted by the scanning driver 20 to the scanning lines G1~G3 are at high level and the scan driving signals GS4~GS6 outputted by the scanning driver 20 to the scanning lines G4~G6 are at low level; as to the switching module 26, during the time period T1, the switching module 26 will switch the sensing lines S1~S6 to make the sensing lines S1~S4 coupled together to the sensing driver 22, but the sensing lines S5~S6 are not coupled to the sensing driver 22; therefore, among the sense driving signals SS1~SS6, only the sense driving signals SS1~SS4 will be transmitted by the sensing lines S1~S4 to the first row of sensing electrodes~the fourth row of sensing electrodes respectively, but the sensing lines S5~S6 will not transmit the sense driving signals SS5~SS6 to the fifth row of sensing electrodes~the sixth row of sensing electrodes respectively. Therefore, during the time period T1, 12 sensing electrodes corresponding to the scanning lines G1~G3 and the sensing lines S1~S4 will be electrically coupled as a sensing electrode set having a sensing gravity center position P1.

Figure 4B:
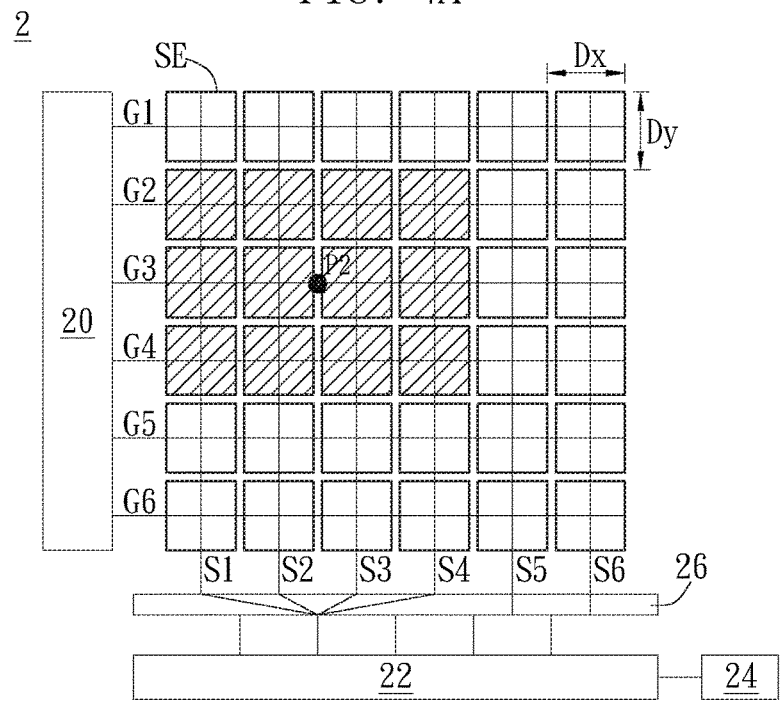

Similarly, when the capacitive fingerprint sensing apparatus 2 is operated under the first self-capacitive sensing mode, as shown in FIG. 4B, during the time period T2, the scan driving signals GS2~GS4 outputted by the scanning driver 20 to the scanning lines G2~G4 are at high level and the scan driving signals GS1, GS5~GS6 outputted by the scanning driver 20 to the scanning lines G1, G5~G6 are at low level; as to the switching module 26, during the time period T2, the switching module 26 will maintain the sensing lines S1~S4 coupled together to the sensing driver 22, and the sensing lines S5~S6 are not coupled to the sensing driver 22; therefore, among the sense driving signals SS1~SS6, only the sense driving signals SS1~SS4 will be transmitted by the sensing lines S1~S4 to the first row of sensing electrodes~the fourth row of sensing electrodes respectively, but the sensing lines S5~S6 will not transmit the sense driving signals SS5~SS6 to the fifth row of sensing electrodes~the sixth row of sensing electrodes respectively. Therefore, during the time period T2, 12 sensing electrodes corresponding to the scanning lines G2~G4 and the sensing lines S1~S4 will be electrically coupled as a sensing electrode set having a sensing gravity center position P2. Then, since the conditions during the time periods T3~T4 will be similar as above, it will not repeat here.

Figure 4C:
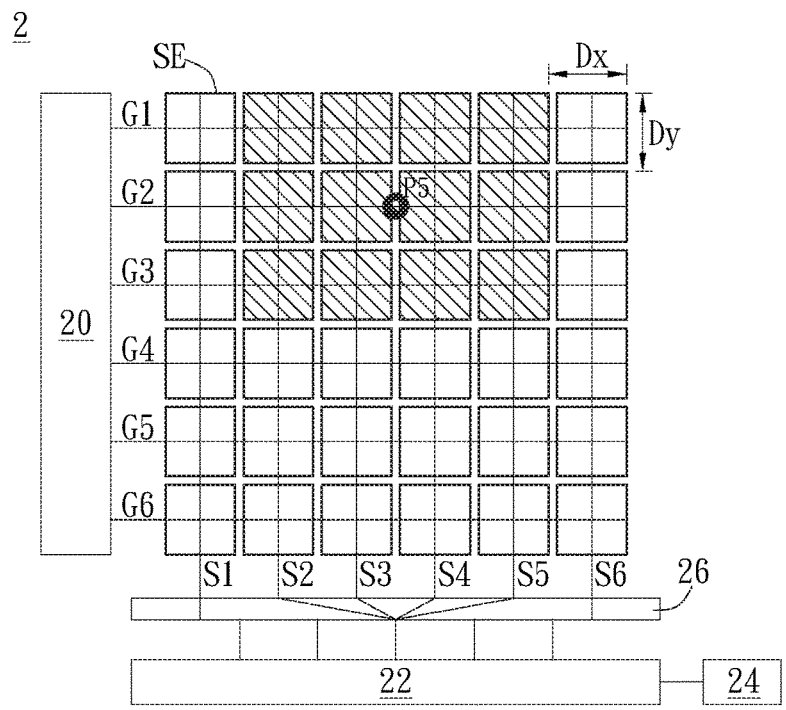

On the other hand, when the capacitive fingerprint sensing apparatus 2 is operated under the second self-capacitive sensing mode, as shown in FIG. 4C, during the time period T5, the scan driving signals GS1~GS3 outputted by the scanning driver 20 to the scanning lines G1~G3 are at high level and the scan driving signals GS4~GS6 outputted by the scanning driver 20 to the scanning lines G4~G6 are at low level; as to the switching module 26, during the time period T5, the switching module 26 will switch the sensing lines S1~S6 to make the sensing lines S2~S5 coupled together to the sensing driver 22, but the sensing lines S1 and S6 are not coupled to the sensing driver 22; therefore, among the sense driving signals SS1~SS6, only the sense driving signals SS2~SS5 will be transmitted by the sensing lines S2~S5 to the second row of sensing electrodes~the fifth row of sensing electrodes respectively, but the sensing lines S1 and S6 will not transmit the sense driving signals SS1 and SS6 to the first row of sensing electrodes and the sixth row of sensing electrodes respectively. Therefore, during the time period T5, 12 sensing electrodes corresponding to the scanning lines G1~G3 and the sensing lines S2~S5 will be electrically coupled as a sensing electrode set having a sensing gravity center position P5.

Figure 4D:
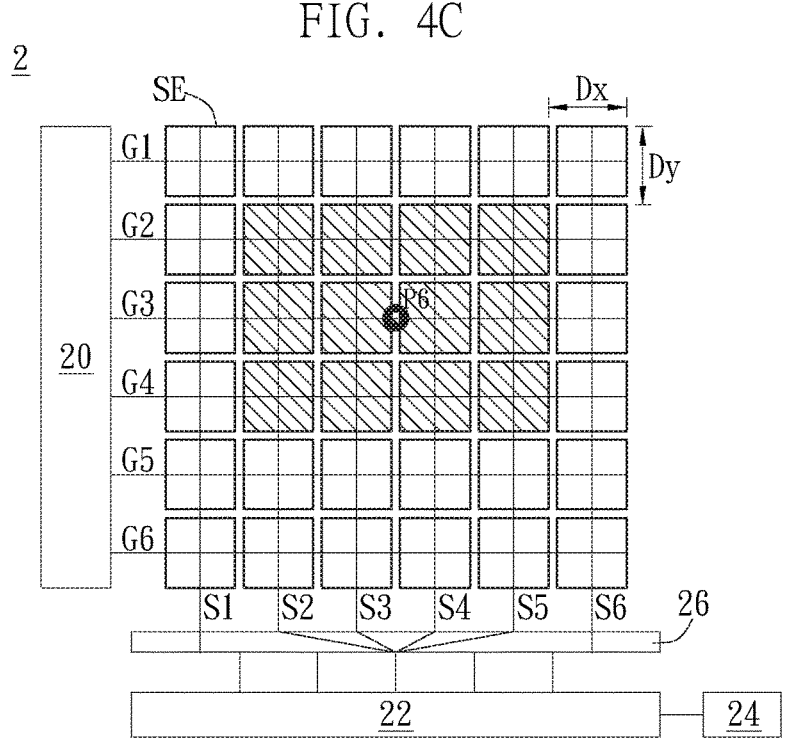

Similarly, when the capacitive fingerprint sensing apparatus 2 is operated under the second self-capacitive sensing mode, as shown in FIG. 4D, during the time period T6, the scan driving signals GS2~GS4 outputted by the scanning driver 20 to the scanning lines G2~G4 are at high level and the scan driving signals GS1, GS5~GS6 outputted by the scanning driver 20 to the scanning lines G1, G5~G6 are at low level; as to the switching module 26, during the time period T6, the switching module 26 will maintain the sensing lines S2~S5 coupled together to the sensing driver 22 and the sensing lines S1 and S6 are not coupled to the sensing driver 22; therefore, among the sense driving signals SS1~SS6, only the sense driving signals SS2~SS5 will be transmitted by the sensing lines S2~S5 to the second row of sensing electrodes~the fifth row of sensing electrodes respectively, but the sensing lines S1 and S6 will not transmit the sense driving signals SS1 and SS6 to the first row of sensing electrodes and the sixth row of sensing electrodes respectively. Therefore, during the time period T6, 12 sensing electrodes corresponding to the scanning lines G2~G4 and the sensing lines S2~S5 will be electrically coupled as a sensing electrode set having a sensing gravity center position P6. Then, since the conditions during the time periods T7~T8 will be similar as above, it will not repeat here.

Similarly, the processing module 24 can combine the first self-capacitive fingerprint pattern obtained by the capacitive fingerprint sensing apparatus 2 under the first self-capacitive sensing mode and the second self-capacitive fingerprint pattern obtained by the capacitive fingerprint sensing apparatus 2 under the second self-capacitive sensing mode into a third self-capacitive fingerprint pattern having higher resolution along at least one direction.

Then, please refer to FIG. 5A~FIG. 5B. FIG. 5A~FIG. 5B illustrate another embodiment of the capacitive fingerprint sensing apparatus of the invention.

As shown in FIG. 5A, when the capacitive fingerprint sensing apparatus 2 of this embodiment is operated under the first self-capacitive sensing mode, during the time period T1, the scan driving signals GS1~GS3 outputted by the scanning driver 20 to the scanning lines G1~G3 are at high level and the scan driving signals GS4~GS6 outputted by the scanning driver 20 to the scanning lines G4~G6 are at low level; as to the switching module 26, during the time period T1, the switching module 26 will switch the sensing lines S1~S6 to make the sensing lines S1~S3 and the sensing lines S4~S6 coupled together to the sensing driver 22 respectively; therefore, the sense driving signals SS1~SS6 will be transmitted by the sensing lines S1~S6 to the first row of sensing electrodes~the sixth row of sensing electrodes respectively. Therefore, during the time period T1, 9 sensing electrodes corresponding to the scanning lines G1~G3 and the sensing lines S1~S3 will be electrically coupled as a sensing electrode set having a sensing gravity center position P1 and 9 sensing electrodes corresponding to the scanning lines G1~G3 and the sensing lines S4~S6 will be electrically coupled as a sensing electrode set having a sensing gravity center position P2.

Similarly, as shown in FIG. 5B, during the time period T2, the scan driving signals GS3~GS5 outputted by the scanning driver 20 to the scanning lines G3~G5 are at high level and the scan driving signals GS1~GS2, GS6 outputted by the scanning driver 20 to the scanning lines G1~G2, G6 are at low level; as to the switching module 26, during the time period T2, the switching module 26 will maintain the sensing lines S1~S3 and the sensing lines S4~S6 coupled together to the sensing driver 22 respectively; therefore, the sense driving signals SS1~SS6 will be transmitted by the sensing lines S1~S6 to the first row of sensing electrodes-~the sixth row of sensing electrodes respectively. Therefore, during the time period T2, 9 sensing electrodes corresponding to the scanning lines G3~G5 and the sensing lines S1~S3 will be electrically coupled as a sensing electrode set having a sensing gravity center position P3 and 9 sensing electrodes corresponding to the scanning lines G3~G5 and the sensing lines S4~S6 will be electrically coupled as a sensing electrode set having a sensing gravity center position P4.

Then, please refer to FIG. 6. FIG. 6 illustrates a schematic diagram of the capacitive fingerprint sensing apparatus 2' including two scanning drivers 20 and 21 in another embodiment of the invention. In this embodiment, as shown in FIG. 6, the capacitive fingerprint sensing apparatus 2' includes two scanning drivers 20~21, a sensing driver 22, a processing module 24, a switching module 26 and a plurality of sensing electrodes SE. The plurality of sensing electrodes SE is arranged in a form of a (6×6) matrix. The capacitive fingerprint sensing apparatus 2' can be operated under a first self-capacitive sensing mode or a second self-capacitive sensing mode. The timing of the sensing driver 20 and the timing of the sensing driver 21 are complementary; namely, the scan driving signals outputted by the sensing drivers 20 and 21 have inverting phases.

The switching module 26 is coupled to the first row of sensing electrodes~the sixth row of sensing electrodes through the sensing lines S1~S6 respectively and the switching module 26 selectively switches the switching module 26 to couple with the sensing driver 22 or not, but not limited to this. The scanning driver 20 is coupled to the first column of sensing electrodes~the sixth column of sensing electrodes through the scanning lines G1~G6 respectively. The scanning lines G1~G6 and the sensing lines S1~S6 are coupled to the plurality of sensing electrodes SE respectively. The first row of sensing electrodes~the sixth row of sensing electrodes are coupled to the shielding signal SHD through wires respectively. When the scanning driver 21 is coupled to the first column of sensing electrodes~the sixth column of sensing electrodes through the scanning lines G1'~G6' respectively, the scanning lines G1'~G6' and the sensing lines S1~S6 will be coupled to the plurality of sensing electrodes SE respectively, but not limited to this.

In addition, the switching module 26 is also coupled to the shielding signal SHD. When the switching module 26 selectively switches the sensing lines S1~S6 to be coupled with the sensing driver 22 or not, the sensing lines S2~S3 and the sensing lines S4~S5 are coupled together to the sensing driver 22 respectively to drive the second row of sensing electrodes~the third row of sensing electrodes and the fourth row of sensing electrodes~the fifth row of sensing electrodes to perform self-capacitive sensing respectively, but the sensing line S1 and S6 are not coupled to the sensing driver 22, so that the first row of sensing electrodes and the sixth row of sensing electrodes are not driven to perform self-capacitive sensing.

In practical applications, in order to protect the first row of sensing electrodes and the sixth row of sensing electrodes without performing self-capacitive sensing from the noise interference from outside, the sensing lines S1 and S6 not coupled to the sensing driver 22 can be coupled to the shielding signal SHD through the scanning driver 21 or the switching module 26, and the shielding signal SHD can be a direct-current (DC) signal, an alternating-current (AC) signal, a ground signal or a sensing related signal, but not limited to this.

Please refer to FIG. 7. FIG. 7 illustrates a timing diagram of the sense driving signals SS1~SS6 and the scan driving signals GS1~GS6 and GS1'~GS6' which are inverting each other during the time periods T6~T10. Since the timings of the scanning drivers 20 and 2 are complementary, the scan driving signals GS1 and GS1' outputted by the sensing drivers 20 and 21 respectively have inverting phases; the scan driving signals GS2 and GS2' outputted by the sensing drivers 20 and 21 respectively have inverting phases, and so on.

Then, Please refer to FIG. 8A~FIG. 8D. As shown in FIG. 8A~FIG. 8D, it can be found that the sensing electrodes SE are arranged in a regular manner and the sensing electrodes SE can have the same size or shape or have different sizes or shapes without specific limitations. For example, the shape of the sensing electrode SE can be square shown in the above-mentioned embodiments, or parallelogram shown in FIG. 8A, hexagonal shown in FIG. 8B, circle shown in FIG. 8C, triangle shown in FIG. 8D or other geometries arranged in a regular manner.

Please also refer to FIG. 9A~FIG. 9C. As shown in FIG. 9A, the fingerprint sensing array AR can be coupled to the host HOST through the multiplexer MUX and the controller IC, so that the host HOST can process the fingerprint sensing signal received by the controller IC; as shown in FIG. 9B, the fingerprint sensing array AR can be coupled to the host HOST through the multiplexer MUX disposed in the controller IC; as shown in FIG. 9C, the amplifying module AMP can be disposed between the multiplexer MUX and the controller IC. In fact, the amplifying module AMP can be made on the glass substrate or integrated into the controller IC, but not limited to this.

Compared to the prior art, the capacitive fingerprint sensing apparatus of the invention uses different self-capacitive sensing electrode sets sharing at least one sensing electrode to perform self-capacitive sensing to obtain different self-capacitive fingerprint sensing patterns respectively and then combines these self-capacitive fingerprint sensing patterns into a combined fingerprint sensing pattern having a resolution larger than the resolutions of these self-capacitive fingerprint sensing patterns along at least one direction.

Therefore, the capacitive fingerprint sensing apparatus of the invention can effectively increase the capacitance sensed by unit sensing electrode without decreasing the resolution, so that it can have good fingerprint sensing performance and high resolution at the same time to overcome the drawbacks and limitations of the conventional self-capacitive fingerprint sensing technology.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A capacitive fingerprint sensing apparatus, operated under a first self-capacitive sensing mode or a second self-capacitive sensing mode, comprising:
    a plurality of sensing electrodes arranged in a regular manner;
    a sensing driver coupled to the plurality of sensing electrodes, the sensing driver combining M adjacent sensing electrodes to form a first sensing electrode set to perform a first self-capacitive sensing to obtain a first self-capacitive fingerprint sensing signal under the first self-capacitive sensing mode; the sensing driver combining N adjacent sensing electrodes to form a second sensing electrode set to perform a second self-capacitive sensing to obtain a second self-capacitive fingerprint sensing signal under the second self-capacitive sensing mode, wherein M and N are positive integers larger than 1; and
    a processing module coupled to the sensing driver, the processing module generating a first self-capacitive fingerprint pattern and a second self-capacitive fingerprint pattern according to the first self-capacitive fingerprint sensing signal and the second self-capacitive fingerprint sensing signal respectively and combining the first self-capacitive fingerprint pattern and the second self-capacitive fingerprint pattern into a third self-capacitive fingerprint pattern;
    wherein the M adjacent sensing electrodes forming the first sensing electrode set and the N adjacent sensing electrodes forming the second sensing electrode set share at least one sensing electrode.

2. The capacitive fingerprint sensing apparatus of claim 1, wherein a resolution of the third self-capacitive fingerprint pattern along at least one direction is larger than resolutions of the first self-capacitive fingerprint pattern and the second self-capacitive fingerprint pattern along the at least one direction.

3. The capacitive fingerprint sensing apparatus of claim 1, wherein sensing points of the first self-capacitive fingerprint pattern and sensing points of the second self-capacitive fingerprint pattern are interlaced to make a resolution of the third self-capacitive fingerprint pattern larger than a resolution of the first self-capacitive fingerprint pattern or a resolution of the second self-capacitive fingerprint pattern.

4. The capacitive fingerprint sensing apparatus of claim 1, wherein the M adjacent sensing electrodes forming the first sensing electrode set are adjacent to each other along a horizontal direction, a vertical direction or an oblique direction.

5. The capacitive fingerprint sensing apparatus of claim 1, wherein the N adjacent sensing electrodes forming the second sensing electrode set are adjacent to each other along a horizontal direction, a vertical direction or an oblique direction.

6. The capacitive fingerprint sensing apparatus of claim 1, wherein the M adjacent sensing electrodes forming the first sensing electrode set are arranged as a matrix comprising P rows of sensing electrodes and Q columns of sensing electrodes, wherein M is a product of P and Q.

7. The capacitive fingerprint sensing apparatus of claim 1, wherein the N adjacent sensing electrodes forming the second sensing electrode set are arranged as a matrix comprising R rows of sensing electrodes and S columns of sensing electrodes, wherein N is a product of R and S.

8. The capacitive fingerprint sensing apparatus of claim 1, wherein the plurality of sensing electrodes has arbitrary geometries.

9. The capacitive fingerprint sensing apparatus of claim 1, wherein the plurality of sensing electrodes has the same size and shape, or the plurality of sensing electrodes has different sizes and shapes.

10. The capacitive fingerprint sensing apparatus of claim 1, wherein the regular manner that the plurality of sensing electrodes is arranged in is a matrix arrangement, a triangle arrangement or an interlacing arrangement.

11. The capacitive fingerprint sensing apparatus of claim 1, further comprising:
    a switching module coupled between the sensing driver and the processing module and configured to selectively switch to the first self-capacitive sensing mode or the second self-capacitive sensing mode and transmit the first self-capacitive fingerprint sensing signal and the second self-capacitive fingerprint sensing signal to the processing module.

12. The capacitive fingerprint sensing apparatus of claim 11, further comprising:
an amplifying module coupled between the switching module and the processing module and configured to amplify the first self-capacitive fingerprint sensing signal and the second self-capacitive fingerprint sensing signal and then transmit the amplified first self-capacitive fingerprint sensing signal and the amplified second self-capacitive fingerprint sensing signal to the processing module.

13. The capacitive fingerprint sensing apparatus of claim 1, wherein under the first self-capacitive sensing mode and the second self-capacitive sensing mode, sensing electrodes without performing self-capacitive sensing in the plurality of sensing electrodes are coupled to a shielding signal to avoid noise interference from outside.

14. The capacitive fingerprint sensing apparatus of claim 13, wherein the shielding signal is a direct-current (DC) signal, an alternating-current (AC) signal, a ground signal or a sensing related signal.

15. The capacitive fingerprint sensing apparatus of claim 13, further comprising:
another sensing driver having a timing complementary to a timing of the sensing driver, the sensing electrodes without performing self-capacitive sensing in the plurality of sensing electrodes are coupled to the shielding signal through the another sensing driver.

16. The capacitive fingerprint sensing apparatus of claim 1, further comprising:
a scanning driver coupled to columns of sensing electrodes in the plurality of sensing electrodes through a plurality of scanning lines respectively.

17. The capacitive fingerprint sensing apparatus of claim 16, wherein the scanning driver drives the columns of sensing electrodes through the plurality of scanning lines in a continuous order.

18. The capacitive fingerprint sensing apparatus of claim 17, wherein the scanning driver only uses one scanning line in the plurality of scanning lines to drive one corresponding column of sensing electrodes in the columns of sensing electrodes at one time.

19. The capacitive fingerprint sensing apparatus of claim 18, wherein the scanning driver uses at least two scanning lines in the plurality of scanning lines to drive at least two corresponding columns of sensing electrodes in the columns of sensing electrodes at one time.

20. The capacitive fingerprint sensing apparatus of claim 16, wherein the scanning driver drives the columns of sensing electrodes through the plurality of scanning lines in a discontinuous order.

21. The capacitive fingerprint sensing apparatus of claim 20, wherein the scanning driver only uses one scanning line in the plurality of scanning lines to drive one corresponding column of sensing electrodes in the columns of sensing electrodes at one time.

22. The capacitive fingerprint sensing apparatus of claim 20, wherein the scanning driver uses at least two scanning lines in the plurality of scanning lines to drive at least two corresponding columns of sensing electrodes in the columns of sensing electrodes at one time.

* * * * *